United States Patent [19]
Hall, III

[11] Patent Number: 5,823,051
[45] Date of Patent: Oct. 20, 1998

[54] MULTI-SPEED POWER TRANSMISSION

[75] Inventor: Arthur Hall, III, Cicero, Ind.

[73] Assignee: General Motors Corporation, Detroit, Mich.

[21] Appl. No.: 841,855

[22] Filed: May 5, 1997

[51] Int. Cl.$^6$ .................................................. F16H 3/08
[52] U.S. Cl. .............................. 74/325; 74/330; 74/331; 475/207; 475/215
[58] Field of Search ........................... 74/325, 329, 330, 74/331; 475/215, 207

[56] References Cited

U.S. PATENT DOCUMENTS

| | | | |
|---|---|---|---|
| 4,461,188 | 7/1984 | Fisher | 74/330 |
| 4,463,621 | 8/1984 | Fisher | 74/330 |
| 4,576,063 | 3/1986 | Akashi et al. | 74/331 X |
| 4,727,764 | 3/1988 | Klaue | 74/331 |
| 4,738,149 | 4/1988 | Janiszewski | 74/330 |
| 4,966,048 | 10/1990 | Braun | 74/331 X |
| 5,613,401 | 3/1997 | Maurizio | 74/325 |
| 5,628,703 | 5/1997 | Roeper | 475/207 X |
| 5,720,203 | 2/1998 | Honda et al. | 74/325 |

*Primary Examiner*—Khoi Q. Ta
*Attorney, Agent, or Firm*—Donald F. Scherer

[57] ABSTRACT

A power transmission has a pair of meshing gear input power paths and a planetary gearset output power path. The meshing gear input power path includes two pair of ratio gears and two pair of transfer gears. The power flow through the meshing gear input power path is drivingly connectible with two members of the planetary gearset. One power path from the input meshing gear is directed to the sun gear through a first transfer gear set and to the carrier assembly through a second transfer gear set and a one-way clutch during first and second ratios. During a third ratio, a direct input path to the carrier and a path through both transfer gearsets is provided. During a fourth and fifth ratio, the direct carrier input path, the meshing gear input paths and the transfer gearset input paths are utilized. Two reverse ratios are accommodated by grounding the carrier and inputting the sun gear through the ratio gear power paths and the first transfer gearset.

4 Claims, 1 Drawing Sheet

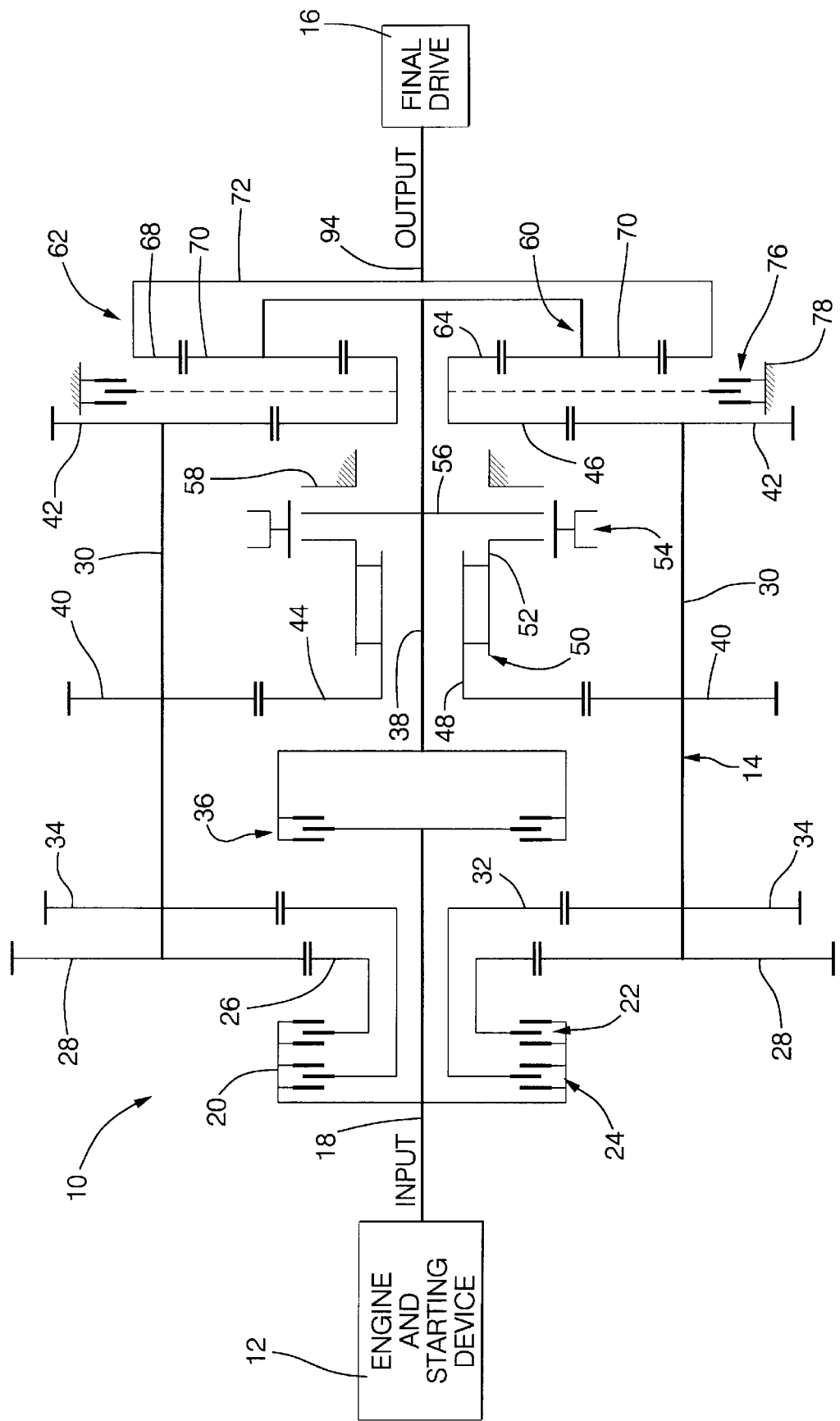

MULTI-SPEED POWER TRANSMISSION

TECHNICAL FIELD

This invention relates to multi-speed power transmissions.

BACKGROUND OF THE INVENTION

Power transmissions are incorporated into powertrains of working vehicles and passenger vehicles. The transmission provides a plurality of drive ratios between an engine and a final drive mechanism, such as a differential. The drive ratio permits the multiplication of engine torque during underdrive ratios and a multiplication of engine speed during overdrive ratios.

With the use of multi-speed power transmissions, the effectiveness of the engine is expanded. The useful speed and torque range of the engine is repeated as each drive ratio is put into operation either manually or by the use of automatic controls. By controlling the drive ratio, the vehicle can be operated at the most fuel efficient point obtainable with the powertrain.

SUMMARY OF THE INVENTION

It is an object of the present invention to provide an improved power transmission.

In one aspect of the present invention, a countershaft transmission provides power paths to a planetary sun gear and three power paths to a planetary carrier in a sequence to provide five forward output ratios and two reverse output ratios at the planetary ring gear.

In another aspect of the present invention, three friction clutches and one synchronizer clutch is used in combination with a countershaft and planetary gear arrangement to establish five forward speed ratios and two reverse ratios.

In a further aspect of the invention, two input gear pairs, two transfer gear pairs and a simple planetary are collectively combined with three friction clutches and a synchronizer clutch to provide five forward drive ratios and two reverse ratios.

In yet a further aspect of the invention, each input gear pair in combination with the transfer gear pairs provides a selective power path between an input shaft and the sun gear and carrier of the planetary gearset to establish two underdrive ratios at the ring gear.

In a still further aspect of the invention, a selectively engageable clutch cooperates with an intermediate shaft to establish a direct power path connection with the carrier assembly and a geared power path through the transfer gears with the sun gear of the planetary.

In another aspect of the invention a geared power path is established at the planetary sun gear in at least five forward and two reverse drive ratios of the transmission.

BRIEF DESCRIPTION OF THE DRAWINGS

The drawing is a schematic representation of a powertrain incorporating the present invention.

DESCRIPTION OF AN EXEMPLARY EMBODIMENT

There is shown in the drawing a powertrain, generally designated 10, having an engine and starting device 12, a multi-speed transmission 14 and a final drive 16 which is operable to drive the vehicle wheels. The engine and starting device 12 are conventional devices, such as an internal combustion engine and a torque converter or starting clutch.

The engine and starting device 12 drive an input shaft 18 which in turn drives a hub 20 to which are selectively connectible a pair of clutches 22 and 24. The clutch 22 is operable to drive a first ratio gear 26 which meshes with ratio gears 28 disposed on countershafts 30. The clutch 24 is controlled to provide a drive or input power flow to a third ratio gear 32 which meshes with ratio gears 34 secured with the countershafts 30. Thus, the selection of clutch 22 provides a drive ratio to the countershafts 30 via the gears 26,28 while the energization of clutch 24 provides a drive ratio to the countershafts 30 via meshing gears 32,34.

The input shaft 18 is also connected with a selectively engageable friction clutch 36 which, when engaged, will connect the input shaft 18 with an intermediate shaft 38. The countershafts 30 also have rotatably connected therewith transfer gears 40 and transfer gears 42. The transfer gears 40 mesh with a transfer gear 44 and the transfer gears 42 mesh with a transfer gear 46. The transfer gear 44 is connected with an inner race 48 of a one-way clutch 50. An outer race 52 of the one-way clutch 50 is connected with a forward/reverse synchronizer assembly 54.

The synchronizer assembly 54 has an output member 56 which is drivingly connected with the intermediate shaft 38. The synchronizer assembly 54 is a conventional device which is operable to selectively connect the outer race 52 with the shaft 38 or to hold the shaft 38 stationary through engagement with a transmission wall or stationary component 58. Thus, the actuation of the synchronizer assembly 54 will alternatively connect the one-way clutch 50 with the intermediate shaft 38 or hold the intermediate shaft 38 stationary.

The intermediate shaft 38 is connected to a carrier assembly 60 which is a component in a simple planetary gearset 62. The planetary gearset 62 also has a sun gear 64 which is drivingly connected with a transfer gear 66 which is disposed in meshing relationship with the transfer gears 42. The planetary gearset 62 also has a ring gear 68 which meshes with pinion gears 70 rotatably disposed in the carrier assembly 60. The pinion gears 70 also mesh with the sun gear 64. The ring gear 62 is drivingly connected through a hub 72 with an output shaft 74 which, in turn, is drivingly connected with the final drive 16 in a conventional manner.

The final drive 16 is a conventional unit, such as a differential gearset, the operation of which is well known in the art. The clutches 22, 24 and 36 are conventional fluid operated friction clutches which include a plurality of friction plates selectively placed into frictional engagement through the energization of a hydraulically operated piston. These devices are well known in the transmission art, such that it is not believed that further description of these devices is necessary for those skilled in the art to understand the operation of the transmission disclosed herein.

The transmission may also incorporate a brake 76 connected with the sun gear 64. The brake connection to the sun gear 64 is shown in dashed lines since the transmission is operable as a five speed transmission without the brake 76 and as a six speed transmission with the brake 76. The brake 76 is a conventional fluid operated friction brake which is energized to connect the sun gear 64 to a stationary housing 78.

During operation of the transmission 14, it is possible to provide five forward speed ratios and two reverse speed ratios without the use of the brake 76. To provide the first or lowest ratio, the clutch 22 is engaged thereby providing a power path through the ratio gears 26 and 28 to the countershafts 30. The countershafts 30 provide power flow paths through transfer gears 40 and 44 to the one-way clutch 50. With the synchronizer 54 placed in the forward drive condition shown, the power path at the one-way clutch 50 is connected with the intermediate shaft 38, which, as previously described, is connected with the carrier assembly 60.

The countershafts 30 also provide a power path via transfer gears 42 and 46 to the sun gear 64. The ring gear 68 will rotate in the forward direction under the combined influence of the power paths at the carrier 60 and the sun gear 64. The ratios established with be described later.

The second forward ratio is established by disengaging the clutch 22 and engaging the clutch 24, thus providing a power flow path between the ratio gears 32 and 34 to the countershafts 30 and from the countershafts 30 through the transfer gears 40,44 and transfer gears 42,46. The transfer gears 40,44, as with the first ratio, transfer the power path via the one-way clutch 50 to the intermediate shaft 38 and then to the carrier assembly 60.

To establish the third forward ratio, the clutch 36 is engaged which the clutch 24 is disengaged. Power flow from the input shaft 18 to the clutch 36 is directed to the intermediate shaft 38 which provides a power flow path to the carrier assembly 60 and also establishes a power flow path between the sun gear 64, the transfer gears 46,42, transfer gears 40,44 and one-way clutch 50.

The fourth forward gear ratio is established by engaging the clutch 24 while the clutch 36 remains engaged. As with the second ratio, the clutch 24 provides a power path to the ratio gears 32,34 and from there to the countershafts 30. With the clutch 36 engaged, the one-way clutch 50 will overrun the inner race 48 such that there is no power path between the transfer gears 40,44. However, there is a power path between the transfer gears 42,46 to the sun gear 64. Therefore, in the fourth ratio, the power flow to the sun gear 64 and the carrier assembly 60 provides the impetus for the forward rotation of the ring gear 68.

The fifth forward ratio is established by disengaging clutch 24 and engaging clutch 22, while the clutch 36 remains engaged. In the fifth forward ratio, the input power path to the sun gear 64 is provided via gears 32,34. The carrier assembly 60 continues to receive power flow from the input shaft 18 through the clutch 64 and intermediate shaft 38. In fifth gear, the one-way clutch 50 is also in an overrunning condition since the outer race 52 will rotate more rapidly than the inner race 48.

To establish the first reverse ratio, the forward/reverse synchronizer assembly 54 is shifted rightward, as viewed in the drawing, to establish a braking connection between the intermediate shaft 38 and the wall. With this established, the clutch 22 is engaged such that a power flow path is established between the ratio gears 26,28 and through the countershafts 30 and thence through the transfer gears 42,46 to the sun gear 64. The sun gear 64 is rotated forwardly, the carrier assembly 60 is held stationary, and the ring gear 62 rotates reversely or opposite to the direction of input shaft rotation to provide a reverse drive ratio with the output shaft 74.

To establish a second reverse ratio, the clutch 24 is engaged while the clutch 22 is disengaged, thus establishing the power flow path between the input shaft 18 and the countershafts 30 via ratio gears 32,34. As with the first reverse ratio, the sun gear 64 receives power flow through the transfer gears 42,46 while the carrier assembly 60 is stationary.

A sixth forward gear can be provided by use of the brake 76 which will hold the sun gear 64 stationary. With the brake 76 engaged, the clutch 36 engaged and the clutches 22 and 24 disengaged, the carrier assembly 60 will receive power flow from the input shaft through the clutch 36 and the intermediate shaft 38. With the carrier assembly driven at engine speed or input speed and the sun gear 64 held stationary, the ring gear 68 will be overdriven such that the output will rotate faster than the input.

As an example of the drive ratios that can be accomplished with the present invention, the following gear tooth members are utilized. Gear 26 has twenty-four teeth; gear 28 has thirty-three teeth; gear 32 has thirty-two teeth; gear 34 has twenty-five teeth; gear 40 has nineteen teeth; gear 44 has thirty-eight teeth; gear 42 has twenty-five teeth; and gear 46 has thirty-two teeth. In the planetary gear arrangement 62, the sun gear 64 has thirty-seven teeth and the ring gear 68 has seventy-nine teeth.

In first gear, the drive ratio between the input and output shaft is 3.73. In the second ratio, the drive ratio between the input and shaft is 2.12. In third gear the drive ratio between the input shaft 18 and output shaft 74 is 1.36. In the fourth gear ratio, the drive ratio is 1.0 between the input shaft 18 and the output shaft 74. In the fifth forward gear ratio, the drive ratio between the input shaft 18 and the output shaft 74 is 0.83. And, if the sixth gear ratio is utilized, the drive ratio will be 0.68. The reverse drive ratios exhibit a first reverse ratio of 3.76 and a second reverse ratio of 2.14.

With these gear tooth numbers and these drive ratios, the step between ratios is very accommodating for both passenger vehicles and for working vehicles. The step ratio between first and second gear is 1.76; the step ratio between second and third gear is 1.56; the step ratio between third and fourth gear is 1.36; the step ratio between fourth and fifth gear is 1.20 and, if a sixth gear is used, the step ratio between fifth and sixth gear is 1.22. The step ratio between reverse 1 and reverse 2 is 1.76. These are generally accepted step ratios in the art of power transmission design.

The use of two countershafts 30 has the benefits of utilizing the bearing loads or balancing the bearing loads on the gear members and the clutches associated with the input shaft 18, the intermediate shaft 30 and the output shaft 74. If a single countershaft 30 was utilized, it is well known that side loading between the gears 26 and 28, gears 32 and 34, gears 40 and 44 and gears 42 and 46, would occur. This would require heavier bearings and perhaps larger shaft diameters to be utilized for the loads to be transmitted. Thus, the two countershafts 30 accommodate the desired bearing loads. The dual countershaft arrangement also accommodates the balancing of loads on the one-way clutch 50.

The sun gear 64 provides a rotating reaction member in the five forward speeds. That is, the speed of the sun gear is controlled by regenerating power through the gearset. The use of regenerated power is known to occur in some transmission arrangements. With the present invention, the sun gear 64 always rotates forwardly at a controlled rate determined by the particular gear connections that are made for the specific drive ratio being utilized.

In the first two forward drive ratios, the ratio gears 26,28 and ratio gears 32,34, as well as transfer gears 46,42 cooperate to establish the rotary speed of the sun gear 64. The carrier speed is also determined by the ratio gears during the first two forward ratios. During the top three gear ratios, that is third, fourth and fifth, the carrier assembly 60 is directly driven by the input and the ratio gears 26,28 and 32,34 only affect the speed of the sun gear during the fourth and fifth ratios. The ratio gears do not affect the speed of the sun gear during the third forward ratio, however, both sets of transfer gears do affect the speed of the sun gear.

The present invention provides for a compact transmission which will provide excellent ratio coverage and the ratio coverage can be varied considerably through the judicious selection of the ratio and transfer gears as well as the design of the planetary unit 62.

I claim:

1. A power transmission comprising:

an input shaft;

a first ratio gear;

a second ratio gear meshing with said first ratio gear;

a third ratio gear;

a fourth ratio gear meshing with said third ratio gear;

countershaft means for supporting rotation of said second ratio gear and said fourth ratio gear;

a first selectively engageable clutch selectively connecting said input shaft with said first ratio gear;

a second selectively engageable clutch selectively connecting said input shaft with said third ratio gear;

a simple planetary gear set having a sun gear, a ring gear and a carrier assembly;

an output shaft connected with said ring gear;

first transfer gear means connecting said countershaft means with said sun gear;

second transfer gear means connecting said countershaft means with a one-way drive assembly;

an intermediate shaft drivingly connected with said carrier assembly and with a forward/reverse drive establishing means for providing a selective drive connection with said one-way drive assembly and with a stationary component; and a third selectively engageable clutch selectively connecting said input shaft with said intermediate shaft to establish a power path between said input shaft and said output shaft exclusive of said first, second, third, and fourth ratio gears and cooperating with said first and second clutches to establish two additional power paths between said input shaft and said output shaft wherein each power path includes one of said first and third ratio gears.

2. The power transmission defined in claim 1 wherein said forward/reverse drive establishing means is comprised of a synchronizer assembly.

3. The power transmission defined in claim 1 wherein said sun gear has geared power flow connection through at least said first transfer gear means in at least five forward ratios.

4. The power transmission defined in claim 3 wherein at least one forward ratio is established between said input and output shafts through the actuation of only said third clutch and said forward/reverse drive establishing means.

* * * * *